(12) United States Patent
Li et al.

(10) Patent No.: US 9,904,987 B2
(45) Date of Patent: Feb. 27, 2018

(54) METHOD AND SYSTEM FOR CORRECTING AERO-OPTICAL THERMAL RADIATION NOISE

(71) Applicant: HUAZHONG UNIVERSITY OF SCIENCE AND TECHNOLOGY, Wuhan, Hubei (CN)

(72) Inventors: Lerenhan Li, Hubei (CN); Nong Sang, Hubei (CN); Changxin Gao, Hubei (CN); Luxin Yan, Hubei (CN); Jin Wang, Hubei (CN); Shiwei Zhang, Hubei (CN); Yuanjie Shao, Hubei (CN); Juncai Peng, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/126,271

(22) PCT Filed: Mar. 17, 2016

(86) PCT No.: PCT/CN2016/076616
§ 371 (c)(1),
(2) Date: Sep. 14, 2016

(87) PCT Pub. No.: WO2017/067130
PCT Pub. Date: Apr. 27, 2017

(65) Prior Publication Data
US 2017/0278220 A1    Sep. 28, 2017

(30) Foreign Application Priority Data

Oct. 21, 2015   (CN) .......................... 2015 1 0689097

(51) Int. Cl.
*G06K 9/40*   (2006.01)
*G06T 5/00*   (2006.01)
(Continued)

(52) U.S. Cl.
CPC ............ *G06T 5/002* (2013.01); *G06T 3/4007* (2013.01); *G06T 7/0002* (2013.01); *G06T 2207/20076* (2013.01)

(58) Field of Classification Search
None
See application file for complete search history.

(56) References Cited

U.S. PATENT DOCUMENTS

2003/0039376 A1    2/2003   Stach

FOREIGN PATENT DOCUMENTS

| CN | 102081737 | 6/2011 |
|---|---|---|
| CN | 102360498 | 2/2012 |

(Continued)

OTHER PUBLICATIONS

International Search Report for international application No. PCT/CN2016/076616, dated Jul. 27, 2016 (9 pages, including English translation).

(Continued)

*Primary Examiner* — Fred Hu
(74) *Attorney, Agent, or Firm* — Hamre, Schumann, Mueller & Larson, P.C.

(57) ABSTRACT

The invention discloses a method for correcting aero-optical thermal radiation noise, comprising steps of: pretreating a degraded image to obtain a multi-scale degraded image group, conducting iteration process of obtaining an optimal solution by using a last scale estimation result as an original value of next scale estimation according to the multi-scale degraded image group, thereby facilitating original-scale bias field estimation, and restoring the degraded image according to the original-scale bias field estimated value thereby obtaining an image after aero-optical thermal radiation noise correction. The invention also discloses a system for correcting aero-optical thermal radiation noise. The (Continued)

invention is capable of solving problems with conventional methods, comprising poor correction effect, high complexity, and incapability in correcting the thermal radiation noise at an image level, and applicable to restoration of an image with aero-optical thermal radiation noise.

10 Claims, 4 Drawing Sheets

(51) Int. Cl.
  *G06T 3/40* (2006.01)
  *G06T 7/00* (2017.01)

(56) References Cited

FOREIGN PATENT DOCUMENTS

| | | |
|---|---|---|
| CN | 103337057 | 10/2013 |
| CN | 103337057 A * | 10/2013 |
| CN | 103942758 | 7/2014 |
| CN | 105160687 | 12/2015 |
| JP | 2002300384 | 10/2002 |

OTHER PUBLICATIONS

L. Li et al., "Aero-thermal Radiation Correction via Multi-scale Bias Field Estimation," 2015 3rd IAPR Asian Conference on Pattern Recognition, IEEE (2015), p. 246-250.

\* cited by examiner

FIG. 4

METHOD AND SYSTEM FOR CORRECTING AERO-OPTICAL THERMAL RADIATION NOISE

TECHNICAL FIELD

The invention relates to the field of pattern recognition technology, and more particularly to a method and system for correcting thermal radiation noise in an infrared image.

BACKGROUND OF THE INVENTION

Positioned in the high-speed airflow, an optical window will suffer from a severe aerodynamic thermal environment due to aerodynamic heating. Under this circumstance, images obtained by uncooled infrared imaging devices are prone to be affected by thermal radiation noise, which may reduce a SNR between an optical detection system and a detected target, as well as image quality. To obtain a clear image, it is required to correct aero-optical thermal radiation noise, and correction accuracy determines high-level image processing in the optical detection system. Therefore, techniques for correcting the thermal radiation noise are of great importance in the optical detection system.

Conventionally, there are two methods for correcting the thermal radiation noise: the first one is a photoelectric based correction method that establishes a relationship between shock wave radiation, image degradation and an operating wavelength according to characteristics of imaging device, optimizes and analyzes a seeker's operating wavelength, and finally selects an appropriate operating wavelength; the second is an optical window based correction method that reduces heating degree of an optical dome and thus correcting the thermal radiation noise by designing a proper window structure and cooling scheme. However, problems with the above-mentioned methods are that, both methods employ a pre-prevention mechanism that suppresses the thermal radiation noise in an initial stage, but they cannot facilitate image restoration for optical images already having the thermal radiation noise.

SUMMARY OF THE INVENTION

In view of the above-mentioned problems, it is an objective of the invention to provide a method and system for correcting aero-optical thermal radiation noise capable of improving the method's convergence speed, and solving problems with conventional methods, comprising poor correction effect, high complexity, and incapability in correcting the thermal radiation noise at an image level by correcting aero-optical thermal radiation noise of a degraded noise itself, and employing a multi-scale bias field estimation method, namely an iteration process of obtaining an optimal solution by using a last scale estimation result as an original value of next scale estimation.

In order to achieve the above goals, this invention provides a method for correcting aero-optical thermal radiation noise, comprising steps of:

(1) pretreating a degraded image $g_0$ thereby obtaining a group of degraded images $\{g_0, g_1, \ldots, g_s\}$ having scales decreasingly ordered;

(2) selecting a degraded image $g_s$ with the least scale from the group as a current scale degraded image $g_j$, and predicting a bias field and a restored image of the current scale degraded image thereby obtaining an estimated value $\hat{b}_j$ of the bias field, as well as an estimated value $\hat{i}_j$ of the restored image;

(3) sampling the estimated value $\hat{b}_j$ of the bias field and the estimated value $\hat{i}_j$ of the restored image in adjacent scales according to the group in step (1), thereby obtaining a bias field $b_{j-1}$ and a restored image $i_{j-1}$ of a next iterated degraded image $g_{j-1}$, predicting the bias field $b_{j-1}$ and the restored image $i_{j-1}$ of the next iterated degraded image $g_{j-1}$ thereby obtaining an estimated value $\hat{b}_{j-1}$ of the bias field, as well as an estimated value $\hat{i}_{j-1}$ of the restored image, assuming j=j−1, and repeating step (3) until an estimated value $\hat{b}_0$ of an original scale bias field is obtained;

(4) restoring the degraded image $g_0$ using the estimated value $\hat{b}_0$ of an original scale bias field, thereby obtaining an image $i_0$ after aero-optical thermal radiation noise correction.

In a class of this embodiment, in step (1), the group of degraded images is obtained by down sampling the degraded image $g_0$ at an equal rate $\lambda$ via a bilinear interpolation scheme.

In a class of this embodiment, the process of predicting a bias field $\hat{b}_j$ and a restored image $g_0$ of the current scale degraded image comprises sub-steps of:

(2-1) establishing an optimized solution model:

$$(\hat{i}, \hat{b}) = \underset{i,b}{\operatorname{argmin}} \frac{1}{2}\|g - i - b\|_2^2 + \alpha \|\nabla b\|_2^2 + \beta \|\nabla i\|_1$$

where $\hat{i}$ represents an estimated value of a restored image, $\hat{b}$ represents an estimated value of a bias field, $\|g-i-b\|_2^2$ represents a data approximation item, $\|\nabla i\|_1$ and $\|\nabla b\|_2^2$ represent data restricted items, and $\alpha$ and $\beta$ represent penalty coefficients, and can be dynamically adjusted according to different experimental requirements;

(2-2) dividing the optimized solution model into two sub-problems, namely an i-sub-problem and a b-sub-problem;

the i-sub-problem being formulated by:

$$\hat{i} = \underset{i}{\operatorname{argmin}} \frac{1}{2}\|g - i - b\|_2^2 + \beta |\nabla_x i| + \beta |\nabla_y i|$$

where $|\nabla_h i|$ and $|\nabla_v i|$ represent data restricted items of a vertical gradient and a horizontal gradient of an image, respectively;

the b-sub-problem being formulated by $$\hat{b} = \underset{b}{\operatorname{argmin}} \frac{1}{2}\|g - i - b\|_2^2 + \alpha \|\nabla b\|_2^2;$$

(2-3) conducting optimal solution on the i-sub-problem and the b-sub-problem, thereby obtaining the estimated value of the bias field, as well as the estimated value of the restored image.

In a class of this embodiment, the process of conducting optimal solution on the i-sub-problem uses a Split Bregman iterative method.

In a class of this embodiment, in step (3), the estimated value of the bias field and the estimated value of the restored image are up-sampled at the equal rate $\lambda$.

In accordance with another embodiment of the invention, provided is a system for correcting aero-optical thermal radiation noise, comprising:

a multi-scale processing module comprising a down-sampling unit and an up-sampling unit, the down-sampling unit operating to pretreat a degraded image $g_0$, namely down sampling the degraded image $g_0$ at an equal rate $\lambda$ via a bilinear interpolation scheme thereby obtaining a group of degraded images $\{g_0, g_1, \ldots, g_s\}$ having scales decreasingly ordered, and the up-sampling unit operating to up-sample a bias field estimated value and a restored image estimated value of a current scale degraded image output by a bias field estimation module, and to transmit up-sampled results to the bias field estimation module;

a bias field estimation module operating to obtain the estimated value of the bias field and the estimated value of the restored image of the current scale degraded image according to a degraded image with the least scale in the group of degraded images, to conduct an iteration process until an estimated value $\hat{b}_0$ of an original scale bias field is obtained, and to transmit the estimated value $\hat{b}_0$ to an image restoration module; and an image restoration module operating to restore the degraded image $g_0$ using the estimated value $\hat{b}_0$ of an original scale bias field, thereby obtaining an image $i_0$ after aero-optical thermal radiation noise correction.

In a class of this embodiment, the bias field estimation module comprises an image selection unit and an iteration processing unit, the image selection unit operates to select a degraded image $g_s$ with the least scale from the group as an initialized input of the iteration processing unit, the iteration processing unit operates to obtain the estimated value of the bias field and the estimated value of the restored image of the current scale degraded image by iteration, until the estimated value $\hat{b}_0$ of the original scale bias field is obtained, and to transmit the estimated value $\hat{b}_0$ to an image restoration module.

In a class of this embodiment, the group of degraded images is obtained by down sampling the degraded image $g_0$ at an equal rate $\lambda$ via a bilinear interpolation scheme.

In a class of this embodiment, the estimated value of the bias field and the estimated value of the restored image are up-sampled at the equal rate $\lambda$.

To summarize, advantages of the present invention over the prior art comprise:

1. The invention can correct the aero-optical thermal radiation noise by obtaining the degraded image, and facilitate comparatively accurate and ideal image restoration results.

2. the invention can quickly obtain an optimal solution and significantly increase a convergence speed by employing a multi-scale bias field estimation method, namely using a last scale estimation result as an original value of next scale estimation.

3. by using the Split Bregman iterative method, the invention further improve the convergence speed, which makes the invention more simple, and especially applicable in correction of the aero-optical thermal radiation noise.

SPECIFIC EMBODIMENTS OF THE INVENTION

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Firstly terms of the invention are explained and interpreted as follows:

bias field: is also referred to as "non-uniform field" indicating non-uniformity of brightness, and widely used in medical image processing. Non-uniformity of brightness is a pixel's spatial variation in brightness in a region of an image, which is caused by artifact and internal non-uniformity of organizational attribution. Non-uniformity of strength or color resulted from a bias field is a very difficult for many image processing algorithms, such as image segmentation, image retrieval, target tracking and recognition, and so on. During image segmentation, normally a target image is assumed to be a piecewise constant, if the image is affected by the bias field, a strength thereof is to be varied gradually, and the assumption does not apply, and some segmentation algorithms cannot work. Taking similarity between the aero-optical thermal radiation noise and the bias field into account, the invention introduces the bias field into correction of the aero-optical thermal radiation noise, constructs a model of a degraded image of aero-optical thermal radiation noise $g$ equal to a sum of a clear image $i$ and the bias model $b$, namely $g=i+b$, and obtains a restore image by using a formula $\hat{i}=g-\hat{b}$, where $\hat{b}$ represents an estimated value of the bias field.

Multi-scale: the multi-scale method obtains an optimal solution by using an estimated value after up-sampling as an original value of next scale estimation, and enables an energy function to be fast converged into a minimum value.

Figure 1:
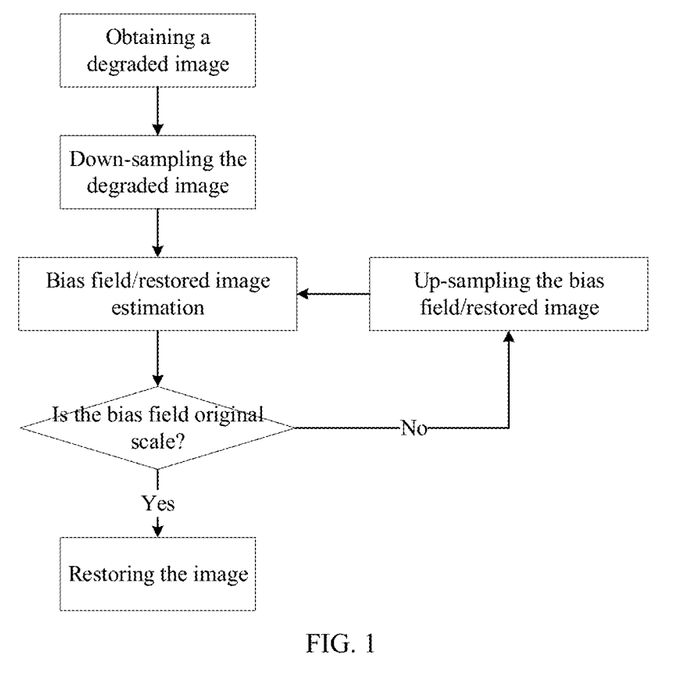
FIG. 1 is a flow chart of a method for correcting aero-optical thermal radiation noise of an exemplary embodiment of the invention.
Figure 2:
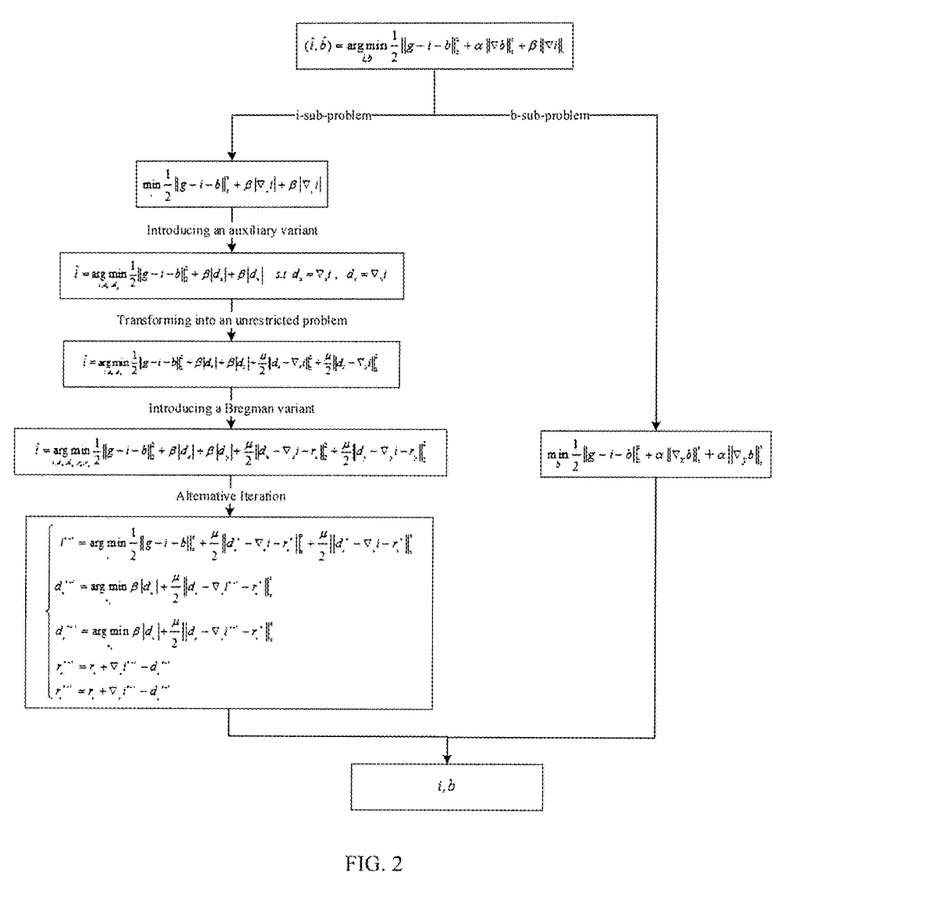
FIG. 2 is a flow chart of an optimal solution and iteration process of the invention.

As shown in FIG. 1, a method for correcting aero-optical thermal radiation noise of the invention comprises steps of:

(1) pretreating a degraded image $g_0$, namely down sampling the degraded image $g_0$ at an equal rate $\lambda$ via a bilinear interpolation scheme, thereby obtaining a group of degraded images $\{g_0, g_1, \ldots, g_s\}$ having scales decreasingly ordered;

(2) selecting a degraded image $g_s$ with the least scale from the group as a current scale degraded image $g_j$, and predicting a bias field and a restored image of the current scale degraded image thereby obtaining an estimated value $\hat{b}_j$ of the bias field, as well as an estimated value $\hat{i}_j$ of the restored image via a least square method;

FIG. 2 illustrates an optimal solution process of a target function. To solve a problem of difficult solution caused by discontinuous 1-norm in the optimal solution process, firstly a Bregman variable is introduced so that an optimal solution is obtained under Split Bregman iteration, then optimal solution is conducted on 2-norm to obtain the bias field of the current scale degraded image, as well as an estimated value of the restored image.

Specifically, an optimized solution model is constructed according to a model $g=i+b$, as indicated by the following equation (1):

$$(\hat{i}, \hat{b}) = \underset{i,b}{\operatorname{argmin}} \frac{1}{2}\|g - i - b\|_2^2 + \alpha\|\nabla b\|_2^2 + \beta\|\nabla i\|_1, \qquad (1)$$

where α and β represent penalty coefficients, and respectively determines smoothness of the bias field during optimization, and amount of structural and detailed information of the restored image, the greater α is, the smoother the estimated bias field will be, the greater β is, the more structural and detailed information of the estimated restored image will be retained. Values of α and β can be adjusted according to experimental requirement. In equation (1), the estimated value $\hat{b}$ of the bias field and the estimated value $\hat{i}$ of the restored image are variables that need to be optimized. Therefore, it is required to conduct optimal solution thereon in an alternative manner. In this way, equation (1) is divided into two sub-problems, namely an i-sub-problem and a b-sub-problem.

the i-sub-problem is formulated by:

$$\hat{i} = \text{argmin}_i \frac{1}{2}\|g - i - b\|_2^2 + \beta|\nabla_x i| + \beta|\nabla_y i| \quad (2)$$

where $|\nabla_x i|$ and $|\nabla_y i|$ represent data restricted items of a vertical gradient and a horizontal gradient of an image, respectively, and are both difficult for solving. In this invention, the Split Bregman iterative method is used for optimal solution. Firstly, an auxiliary variable d is introduced to transform equation (2) into a restricted problem as following equation (3):

$$\hat{i} = \text{argmin}_{i,d_x,d_y} \frac{1}{2}\|g - i - b\|_2^2 + \beta|d_x| + \beta|d_y| \quad (3)$$

s.t $$d_x = \nabla_x i,$$

$$d_y = \nabla_y i$$

Next, a data approximation item is introduced to transform equation (3) into an unrestricted problem as following equation (4):

$$\hat{i} = \text{argmin}_{i,d_x,d_y} \frac{1}{2}\|g - i - b\|_2^2 + \beta|d_x| + \beta|d_y| + \frac{\mu}{2}\|d_x - \nabla_x i\|_2^2 + \quad (4)$$

$$\frac{\mu}{2}\|d_y - \nabla_y i\|_2^2$$

where μ should be large enough to ensure equivalence of equations (3) and (4) during transformation. A value of μ can be adjusted according to experimental requirement. Finally, a Bregman variant r is introduced, and the following equation (5) is obtained:

$$\hat{i} = \text{argmin}_{i,d_x,d_y,r_x,r_y} \frac{1}{2}\|g - i - b\|_2^2 + \beta|d_x| + \quad (5)$$

$$\beta|d_y| + \frac{\mu}{2}\|d_x - \nabla_x i - r_x\|_2^2 + \frac{\mu}{2}\|d_y - \nabla_y i - r_y\|_2^2$$

Equation (5) can conduct optimal solution by iteration of variants i, d and r, and the specific solution is as following (6):

$$\begin{cases} i^{k+1} = \text{argmin}_i \frac{1}{2}\|g - i - b\|_2^2 + \frac{\mu}{2}\|d_x^k - \nabla_x i - r_x^k\|_2^2 + \frac{\mu}{2}\|d_y^k - \nabla_y i - r_y^k\|_2^2 \\ d_x^{k+1} = \text{argmin}_{d_x} \beta|d_x| + \frac{\mu}{2}\|d_x - \nabla_x i^{k+1} - r_x^k\|_2^2 \\ d_y^{k+1} = \text{argmin}_{d_y} \beta|d_y| + \frac{\mu}{2}\|d_y - \nabla_y i^{k+1} - r_y^k\|_2^2 \\ r_x^{k+1} = r_x + \nabla_x i^{k+1} - d_x^{k+1} \\ r_y^{k+1} = r_y + \nabla_y i^{k+1} - d_y^{k+1} \end{cases} \quad (6)$$

By iteration of equation (6), an optical solution of equation (2) can be obtained.

the b-sub-problem is formulated by the following equation (7):

$$\hat{b} = \text{argmin}_b \frac{1}{2}\|g - i - b\|_2^2 + \alpha\|\nabla b\|_2^2 \quad (7)$$

Equation (7) can obtain an optimal solution by a least square method.

(3) sampling the estimated value of the bias field and the estimated value $\hat{i}_j$ of the restored image in adjacent scales according to the group in step (1), thereby obtaining a bias field $b_{j-1}$ and a restored image $i_{j-1}$ of a next iterated degraded image $g_{j-1}$, predicting the bias field $b_{j-1}$ and the restored image $i_{j-1}$ of the next iterated degraded image $g_{j-1}$ thereby obtaining an estimated value $\hat{b}_{j-1}$ of the bias field, as well as an estimated value $\hat{i}_{j-1}$ of the restored image, assuming j=j−1, and repeating step (3) until an estimated value $\hat{b}_0$ of an original scale bias field is obtained;

(4) restoring the degraded image $g_0$ using the estimated value $\hat{b}_0$ of an original scale bias field, thereby obtaining an image $i_0$ after aero-optical thermal radiation noise correction.

Figure 3:
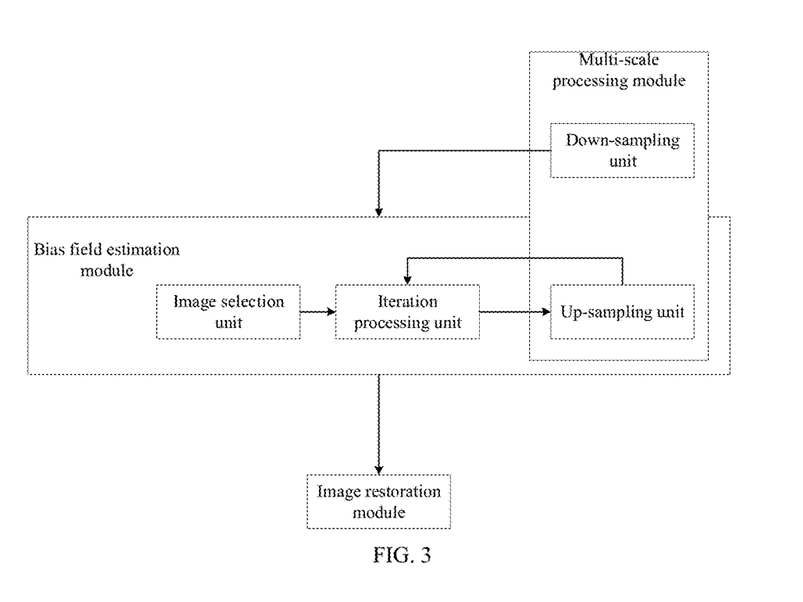
FIG. 3 is a block diagram of a system for correcting aero-optical thermal radiation noise of another exemplary embodiment of the invention.

FIG. 3 is a block diagram corresponding to FIG. 1. As shown in FIG. 3, a system for correcting aero-optical thermal radiation noise of the invention comprises:

a multi-scale processing module comprising a down-sampling unit and an up-sampling unit, the down-sampling unit operating to pretreat a degraded image $g_0$, namely down sampling the degraded image $g_0$ at an equal rate λ via a bilinear interpolation scheme, thereby obtaining a group of degraded images $\{g_0, g_1, \ldots, g_s\}$ having scales decreasingly ordered, and the up-sampling unit operating to up-sample a bias field estimated value and a restored image estimated value of a current scale degraded image output by a bias field estimation module, and to transmit up-sampled results to the bias field estimation module, and the up-sampling unit up-sampling the estimated value of the bias field and the estimated value of the restored image at the equal rate λ;

a bias field estimation module operating to obtain the estimated value of the bias field and the estimated value of the restored image of the current scale degraded image according to a degraded image with the least scale in the group of degraded images, to conduct an iteration process until an estimated value $\hat{b}_0$ of an original scale bias field is obtained, and to transmit the estimated value $\hat{b}_0$ to an image restoration module;

the bias field estimation module comprises an image selection unit and an iteration processing unit, the image selection unit operates to select a degraded image $g_s$ with the least scale from the group as an initialized input of the iteration processing unit, the iteration processing unit operates to obtain the estimated value of the bias field and the estimated value of the restored image of the current scale degraded image by iteration, until the estimated value $\hat{b}_0$ of the original scale bias field is obtained, and to transmit the estimated value $\hat{b}_0$ to an image restoration module; and an image restoration module connected to the bias field estimation module, and operating to restore the degraded image $g_0$ by using the estimated value $\hat{b}_0$ of an original scale bias field, thereby obtaining an image $i_0$ after aero-optical thermal radiation noise correction.

Figure 4:
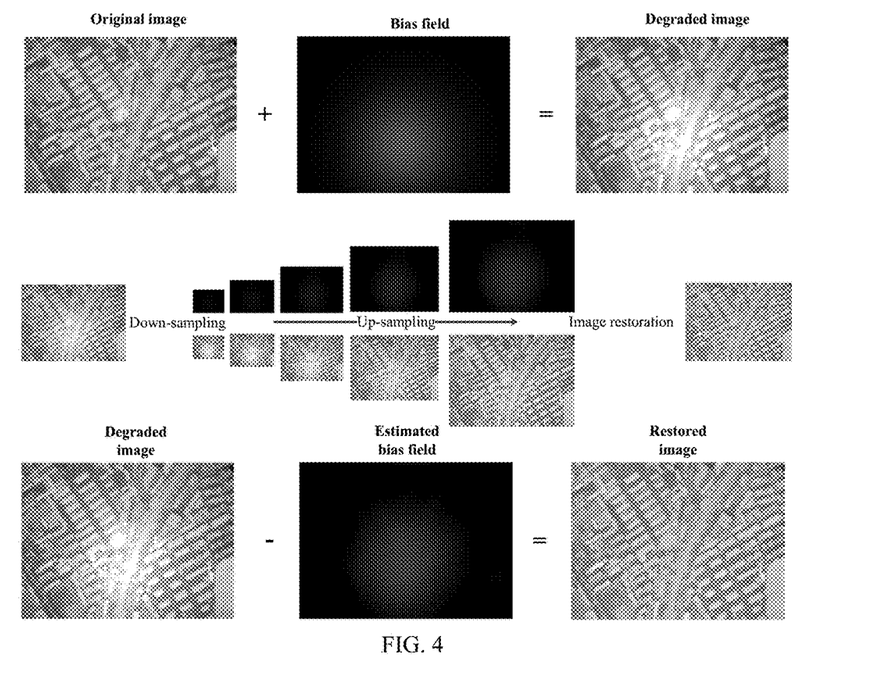
FIG. 4 illustrates correction results by using the method of the invention.

FIG. 4 illustrates correction results by using the method of the invention. It can be seen from FIG. 4 that by using the method for correcting aero-optical thermal radiation noise of the invention, namely firstly down-sampling the degraded image and conducting multi-scale bias field estimation thereon, thereby obtaining the estimated value of the original scale bias field, and thus restoring the degraded image, and by comparing the restored image with the degraded image in FIG. 4, the invention features comparatively accurate and ideal image restoration effect. In addition, the invention significantly increases a convergence speed, and thus being especially suitable for correction of aero-optical thermal radiation noise.

While preferred embodiments of the invention have been described above, the invention is not limited to disclosure in these embodiments and the accompanying drawings. Any changes or modifications without departing from the spirit of the invention fall within the scope of the invention.

What is claimed is:

1. A method of correcting aero-optical thermal radiation noise, comprising:
    obtaining a degraded image $g_0$ from an infrared imaging device positioned in a high-speed airflow, wherein the degraded image $g_0$ includes thermal radiation noise;
    pretreating the degraded image $g_0$ thereby obtaining a group of degraded images $\{g_0, g_1, \ldots g_s\}$ having scales decreasingly ordered;
    selecting a degraded image $g_s$ from the group of degraded images $\{g_0, g_1, \ldots g_s\}$ having the least scale from the group as a current scale degraded image $g_j$, and predicting a bias field and a restored image of the current scale degraded image thereby obtaining an estimated value $\hat{b}_j$ of the bias field and an estimated value $\hat{i}_j$ of the restored image;
    sampling the estimated value $\hat{b}_j$ of the bias field and the estimated value $\hat{i}_j$ of the restored image in adjacent scales according to the group of degraded images $\{g_0, g_1, \ldots g_s\}$ having scales decreasingly ordered, thereby obtaining a bias field $b_{j-1}$ and a restored image $i_{j-1}$ of a next iterated degraded image $g_{j-1}$, predicting the bias field $b_{j-1}$ and the restored image $i_{j-1}$ of the next iterated degraded image $g_{j-1}$ thereby obtaining an estimated value $\hat{b}_{j-1}$ of the bias field, as well as an estimated value $\hat{i}_{j-1}$ of the restored image, assuming j=j−1, and repeating the sampling until an estimated value $\hat{b}_0$ of an original scale bias field is obtained;
    restoring the degraded image $g_0$ by using the estimated value $\hat{b}_0$ of an original scale bias field, thereby obtaining an image $i_0$ after aero-optical thermal radiation noise correction; and
    outputting the image $i_0$ after aero-optical thermal radiation noise correction.

2. The method of correcting aero-optical thermal radiation noise of claim 1, wherein pretreating the degraded image $g_0$ thereby obtaining a group of degraded images $\{g_0, g_1, \ldots g_s\}$ having scales decreasingly ordered includes down sampling the degraded image $g_0$ at an equal rate $\lambda$ via a bilinear interpolation scheme.

3. The method of correcting aero-optical thermal radiation noise of claim 1, wherein predicting the bias field and the restored image of the current scale degraded image includes:
    establishing an optimized solution model:

$$(\hat{i}, \hat{b}) = \underset{i,b}{\operatorname{argmin}} \frac{1}{2}\|g - i - b\|_2^2 + \alpha\|\nabla b\|_2^2 + \beta\|\nabla i\|_1$$

where $\hat{i}$ represents an estimated value of a restored image, $\hat{b}$ represents an estimated value of a bias field, $\|g-i-b\|_2^2$ represents a data approximation item, $\|\nabla i\|_1$ and $\|\nabla b\|_2^2$ represent data restricted items, and $\alpha$ and $\beta$ represent penalty coefficients that are dynamically adjustable;
    dividing the optimized solution model into two sub-problems including an i-sub-problem and a b-sub-problem;
    the i-sub-problem being formulated by:

$$\hat{i} = \underset{i}{\operatorname{argmin}} \frac{1}{2}\|g - i - b\|_2^2 + \beta|\nabla_x i| + \beta|\nabla_y i|$$

where $|\nabla_x i|$ and $|\nabla_y i|$ represent data restricted items of a vertical gradient and a horizontal gradient of an image, respectively;
    the b-sub-problem being formulated by $$\hat{b} = \underset{b}{\operatorname{argmin}} \frac{1}{2}\|g - i - b\|_2^2 + \alpha\|\nabla b\|_2^2;$$

determining an optimal solution of the i-sub-problem and the b-sub-problem, thereby obtaining the estimated value of the bias field and the estimated value of the restored image.

4. The method of correcting aero-optical thermal radiation noise of claim 3, wherein determining the optimal solution of the i-sub-problem uses a Split Bregman iterative method.

5. The method of correcting aero-optical thermal radiation noise of claim 2, wherein sampling the estimated value $\hat{b}_j$ of the bias field and the estimated value $\hat{i}_j$ of the restored image in adjacent scales according to the group in step (1) the estimated value of the bias field and the estimated value of the restored image are up-sampled at the equal rate $\lambda$.

6. A system of correcting aero-optical thermal radiation noise, comprising:
    a multi-scale processor comprising a down-sampler and an up-sampler, the down-sampler pretreats a degraded image $g_0$, thereby obtaining a group of degraded images $\{g_0, g_1, \ldots g_s\}$ having scales decreasingly ordered, and the up-sampler up-samples a bias field estimated value and a restored image estimated value of a current scale degraded image output by a bias field estimator, and to transmit up-sampled results to the bias field estimator;
    a bias field estimator that obtains an estimated value of the bias field and the estimated value of the restored image of the current scale degraded image according to a degraded image with the least scale in the group of degraded images, to conduct an iteration process until an estimated value $\hat{b}_0$ of an original scale bias field is obtained, and to transmit the estimated value $\hat{b}_0$ to an image restorer; and an image restorer that restores the degraded image $g_0$ by using the estimated value $\hat{b}_0$ of an original scale bias field, thereby obtaining an image $i_0$ after aero-optical thermal radiation noise correction, wherein the image restorer outputs the image $i_0$ after aero-optical thermal radiation noise correction.

7. The system of correcting aero-optical thermal radiation noise of claim 6, wherein the bias field estimator comprises an image selector and an iteration processor;

the image selector selects a degraded image $g_s$ with the least scale from the group as an initialized input of the iteration processor;

iteration processor obtains the estimated value of the bias field and the estimated value of the restored image of the current scale degraded image by iteration, until the estimated value $\hat{b}_0$ of the original scale bias field is obtained, and transmits the estimated value $\hat{b}_0$ to an image restorer.

8. The system of correcting aero-optical thermal radiation noise of claim 6, wherein the group of degraded images is obtained by down sampling the degraded image $g_0$ at an equal rate $\lambda$ via a bilinear interpolation scheme.

9. The system of correcting aero-optical thermal radiation noise of claim 8, wherein the estimated value of the bias field and the estimated value of the restored image are up-sampled at the equal rate $\lambda$ by the up-sampler.

10. The method of correcting aero-optical thermal radiation noise of claim 1, wherein selecting the degraded image $g_s$ from the group of degraded images $\{g_0, g_1, \ldots g_s\}$ having the least scale from the group as a current scale degraded image $g_j$, and predicting a bias field and a restored image of the current scale degraded image thereby obtaining an estimated value $\hat{b}_j$ of the bias field and an estimated value $\hat{i}_j$ of the restored image increases a convergence speed, thereby reducing a processing time to output the image $i_0$ after aero-optical thermal radiation noise correction.

* * * * *